United States Patent [19]

Zado

[11] Patent Number: 4,478,650

[45] Date of Patent: Oct. 23, 1984

[54] WATER SOLUBLE FLUX

[75] Inventor: Frank M. Zado, Lawrence Township, Mercer County, N.J.

[73] Assignee: AT&T Technologies, Inc., New York, N.Y.

[21] Appl. No.: 543,649

[22] Filed: Oct. 19, 1983

[51] Int. Cl.$^3$ ............................................. B23K 35/34
[52] U.S. Cl. ........................................ 148/23; 148/24; 148/25; 219/129
[58] Field of Search ....................... 148/23, 24, 25, 26; 219/129

[56] References Cited

U.S. PATENT DOCUMENTS

| | | | |
|---|---|---|---|
| 4,168,996 | 9/1979 | Zado | 148/23 |
| 4,342,607 | 8/1982 | Zado | 148/23 |
| 4,360,392 | 11/1982 | Roberts | 148/23 |

FOREIGN PATENT DOCUMENTS

| | | |
|---|---|---|
| 982457 | 1/1976 | Canada . |
| 2108542 | 9/1971 | Fed. Rep. of Germany . |
| 2116012 | 10/1971 | Fed. Rep. of Germany . |
| 2086944A | 12/1980 | United Kingdom . |
| 460965 | 6/1973 | U.S.S.R. . |
| 812484 | 5/1979 | U.S.S.R. . |

*Primary Examiner*—Veronica O'Keefe
*Attorney, Agent, or Firm*—J. F. Spivak

[57] ABSTRACT

A rosin free, water soluble solder flux suitable for use as a fusing fluid in high temperature solder operations has been developed. The novel flux comprises a high molecular weight amine activator, at least one other activator selected from a water soluble organic acid activator and an inorganic acid activator, and a solvent mixture. The acid activators are present in an amount which essentially neutralizes the amine.

21 Claims, No Drawings

WATER SOLUBLE FLUX

TECHNICAL FIELD

This invention relates to fusing fluids and particularly to water soluble fusing fluids suitable for use as solder flux in various types of high temperature soldering techniques.

BACKGROUND OF THE INVENTION

In soldering electronic components, circuits, equipment and the like, various kinds of fluxes are used together with soldering material so as to improve the efficiency of the soldering operation, to secure the soldered connections and to improve the long-term reliability of the connections while maintaining proper electrical performance. Conventionally, there are three broad categories of flux: (1) natural rosin, (2) activated rosin having a halogenated compound or organic acid activator incorporated with natural rosin, and (3) rosin free flux, generally referred to as water soluble flux.

Natural rosin flux is a stable flux but results in a solid rosin flux residue which, if not completely removed, results in serious contact resistance problems in electronic relays, connectors, gold fingers and printed wiring board (PWB) circuitry. Excessive rosin flux residues also prevent the adherence of protective coatings commonly applied to finished electronic circuit assemblies. It presents few problems with respect to corrosiveness.

Activated rosin flux has a stability similar to natural rosin flux and causes little corrosion at room temperature. Fully activated fluxes have a strong fluxing action at soldering temperatures due to activators, such as an amine hydrochloride, which are typically present in high concentrations such as 1 to 10 weight percent of the resultant flux. However, the fully activated rosin flux has disadvantages in that at soldering temperatures a corrosive gas is produced. Moreover, the residues of the activated rosin combine with moisture to produce corrosive acid. Presently available fluxes containing organic amine hydrohalides in the form of neutral salts such as glutamic acid hydrochloride, either form corrosive metal halides at elevated temperature or the residues thereof combine with moisture at room temperature to form a corrosive acid and thus are used with possible deleterious effect for electrical soldering applications.

There are also mildly activated rosin fluxes such as those taught in U.S. Pat. No. 4,168,996. While these are not corrosive, they still suffer from the same disadvantage of rosin flux in that the flux residue is difficult to remove.

Rosin free fluxes are very useful in removing oxides from the metal surface to be soldered. They generally have the distinct advantage of being relatively easily removed from the device by simple washing with a suitable solvent, alkaline detergent or water. However, there are disadvantages to their use because they frequently contain either strong acids, such as hyrochloric acid or strong organic acids, or an inorganic salt which hydrolyzes in water to give an acid reaction. Therefore, they are apt to destroy metallic material or to leave residues which corrode the soldered parts after soldering, thereby resulting in decreased reliability of the soldered parts with respect to electrical and mechanical properties.

Furthermore, some rosin free fluxes comprise polyethylene glycol and/or it derivatives as a flux vehicle. It has been found that such fluxes interact with the polymeric surfaces of electronic devices, e.g., in printed wiring boards, to modify them so that they become more conductive, thereby increasing still further the chances of device malfunctioning. The change in substrate surface quality with regard to conduction is measurable as a decrease in insulation resistance.

The above-mentioned disadvantages have been substantially alleviated by a rosin free, water soluble flux as set forth in U.S. Pat. No. 4,342,607 when employing low or medium temperature soldering operations, e.g., 350°–500° F. However, when the soldering operation is a higher temperature operation or when greater flux activation is necessary such as in I.R. solder reflow or hot gas leveling techniques, greater thermal stability and/or flux activation is often required than is available from the fluxes taught previously. This high thermal stress exerted on the printed wiring board material makes this process particularly sensitive to the proper choice of the fusing fluid. Because typical polyethylene glycol based fusing fluids show a particular tendency to lower the insulation resistance of the printed wiring product at such high temperatures, there is an obvious need for a high quality and electrically reliable (insulation resistance) fusing fluid.

SUMMARY OF THE INVENTION

A rosin free, water soluble solder flux suitable for use as a fusing fluid in high temperature solder operations has been developed. The novel flux comprises a high molecular weight amine activator, at least one other activator selected from a water soluble organic acid activator and an inorganic acid activator, and a solvent mixture. The acid activators are present in an amount which essentially neutralizes the amine.

DETAILED DESCRIPTION

The present invention is an essentially neutral rosin free flux comprising a high molecular weight water soluble amine activator (activator A), at least one of a water soluble organic acid activator (activator B) and an inorganic acid activator (activator C) and a solvent. The composition may also contain a vehicle which is distinguishable from the solvent in that it does not readily evaporate when subjected to the soldering temperatures and acts to hold the active ingredients. The flux is particularly suitable for use in high temperature soldering operations such as in infrared solder reflow and frequently in high temperature hot gas leveling soldering operations where temperatures of up to 600° F. are often encountered. However, the novel fusing fluid is not limited to use in high temperature soldering operations and may be used in other and lower temperature fusing operations as well such as lower temperature hot air leveling and general soldering processes. The novel flux is highly thermally stable as compared with prior art water soluble fluxes and possesses sufficient chemical activity for use in I.R. reflow and hot gas leveling solder techniques while still resulting in a high insulation resistance.

It has been discovered that while polypropylene glycol itself does not have sufficient thermal stability (it is too volatile) and that higher molecular weight glycols are generally not sufficiently soluble in water, the amine derivatives of polyalkalene glycols, e.g., the amine derivative of polypropylene glycol or higher molecular weight glycols are both sufficiently thermally stable and water soluble. The amine group can act as a chain extender coupling two polyalkylene glycols by means of the amine nitrogen. This enhances the thermal stability of the polyalkalene glycol, e.g., polypropylene glycol, while maintaining water solubility. Such amine derivatives of polypropylene glycol are commercially available under the trade names of Quadrol (BASF), and Jeffamine (Texaco Chemical) to name a few.

While the use of those amino derivatives solved one problem, in certain instances, I discovered that the alkalinity of the amine sometimes resulted in excessive tin and lead contaminating "white" residues after soldering. Consequently, the flux must be substantially neutralized by the addition of acid moieties. Suitable acids are water soluble organic monobasic, dibasic and polybasic acids such as glycolic and acetic acids, malonic, glutaric, tartaric and citric acids as well as a variety of sulfonic acids, and inorganic acids such as hydrochloric and sulfuric acids. The composition may contain one or a mixture of any of the organic and/or inorganic acids. The suitable acids chemically react with the polyglycolamines during the flux formulation resulting in a thermally stable water soluble salt. The salt slowly dissociates at the soldering temperatures so as to gradually release small amounts of acid which effectively clean the surface of the parts to be soldered. It should be noted that when the novel flux is used in lower temperature soldering operations, e.g., wave soldering, pure polypropylene glycol may be substituted for a portion of the amine derivative for optimum performance and the retention of superior electrical characteristics of the soldered circuit.

In order to achieve the best results, I have found that it is important to prepare the flux by mixing the components in a specified manner. While the mixing procedure is not critical generally, it is essential for attaining optimum performance and assuring good reproducibility of the flux formulation and its performance.

Generally, the novel formulation is prepared by first mixing the required amount of the amino glycol, vehicle (if any) and a high boiling neutral solvent; heating the mixture while stirring; and slowly addig the organic and/or inorganic acids to be used into the heated solution. Mixing is continued after all the acid is added. The solution is then allowed to cool and a low boiling solvent is added to adjust the viscosity of the otherwise generally viscous composition. The ratio of solvent to amino glycol depends upon the application in which the flux is to be employed. The amount of acid components is generally enough to form an essentially neutral (or slightly acidic solution), e.g., ~pH 6-7 as measured when diluted in water to form a 5% flux solution. Where the surface is one that is generally difficult to solder it is desirable to add some diethylamine hydrochloride activator to the formulation. This component is preferably added with the amino glycol during preparation.

EXAMPLE 1

Mix 35 grams Quadrol

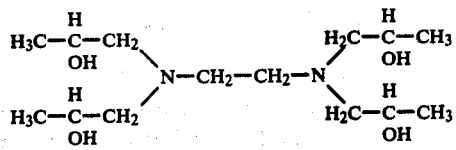

7 grams polypropylene glycol amine vehicle and 13 grams methyl Carbitol (diethylene glycol monomethyl ether). This mixture is preheated to 180° F. with stirring. Gradually add 2 grams citric acid and 4 grams of glycolic acid to the heated mixture with stirring, maintaining the temperature of the solution at least at 170° F. Continue mixing after all the acid is added and then allow the resultant viscous fluid to cool. When below about 110° F., add 38 grams methyl Cellosolve, (2-methoxy ethanol) stir until homogeneous and cool to room temperature.

EXAMPLE 2

Mix thoroughly 38.8 grams of Quadrol 7.8 grams polypropylene glycol, 20.2 grams methyl Carbitol, 4.7 grams diethylamine hydrochloride, 4.6 grams glycolic acid and 3.9 grams citric acid in the order given. Heat the mixture at 170° F. until the solution becomes a pale yellow transparent fluid. Cool to about 110° F. and add 20 grams methyl Cellosolve and mix until homogeneous. Cool to room temperature. The flux has a density at room temperature of 1.055 and its 5% aqueous working solution has a pH of between 6 and 7.

While the examples specify Quadrol it should be understood that other aminopolyalkene glycols are also suitable, e.g., Jeffamine 400 and Jeffamine 2000 which contain primary polypropylene glycol amine. Similarly, any acid which will form a salt with the aminopolyalkalene glycol which salt slowly decomposes at or about the soldering temperature to give off an acid which will clean the surface of the metal to be soldered is suitable. Various examples of such acids have been given herein. Further, any water miscible solvent which is chemically inert with the other flux components and in which such components are soluble are satisfactory. Such solvents include aliphatic alcohols, alkoxy alcohols and the common chlorinated solvents as well as the type of solvents mentioned above. Of course, it is preferred that one of the solvents be a relatively high boiling point material such as the alkyl Carbitols or Cellosolves. Generally, typical ranges of each of the components are as follows:

| | |
|---|---|
| aminopolyalkylenes glycol | 5-45% |
| polypropylene glycol or other vehicle | 0-25% |
| organic and/or inorganic acid | 2-35% |
| | (enough to neutralize the amine) |
| amine hydrohalide activator | 0-8% |
| solvent mixture | 30-70% |

(All % are in weight percent of the flux composition.)

In operation the metal surface of a first member and the metal surface of a second metal surface, to be soldered and joined together, are treated with the liquid solder flux using any conventional technique, e.g., dipping, spraying, brushing, rolling, foaming, wave fluxing, etc. The solvent of the flux is evaporated and at least one of the flux treated surfaces is then treated with molten solder, again using any conventional technique, e.g., hot air reflow soldering, to form a desired solder deposit.

Comparing the insulation resistance of comb-type test patterns processed identically except for the flux employed, i.e., a flux according to example 1 vs. a commercially available water soluble flux, and fusing fluids, it was found that with water rinsing subsequent to soldering, the novel flux resulted in insulation resistances of from 20 to 100 times greater than obtained with commercial fluxes. This is further shown in the Table given below. The control pattern represents the insulation resistance of the test pattern prior to treatment with any fusing fluid.

TABLE I

INSULATION RESISTANCE VALUES OF PRINTED CIRCUITS BOARDS PROCESSED WITH VARIOUS FUSING FLUIDS TEST AT 35° C./90% RH

| Fusing Fluids | Insulation Resistance |
| --- | --- |
| General trade products | $10^1$–$10^3$ MEGOHM |
| Fluids according to this invention | $10^4$–$10^5$ MEGOHM |
| Control pattern | $10^5$ MEGOHM |

It has been also found frequently, not only that fusing fluids of this invention are superior to general trade products but that the insulation resistance of the processed test pattern is better than that of the control, i.e., new precleaned but otherwise not processed test pattern.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A rosin free water soluble flux comprising a high molecular weight polyalkylene glycol amine activator, a water soluble acid activator in an amount which essentially neutralizes the amine and a solvent mixture.

2. The flux recited in claim 1, wherein the amine activator is a polyalkalene glycol amine and said acid activator is selected from the group consisting of organic acids and inorganic acids.

3. The flux recited in claim 2, wherein the alkalene group of the polyalkalene glycol amine is propylene or a higher molecular weight homolog.

4. The flux recited in claim 3, wherein the acid activator is selected from the group consisting of citric, tartaric, glycolic, glutaric, malonic, acetic, sulfonic, hydrochloric, sulfuric and mixtures thereof.

5. A rosin free water soluble flux comprising a polypropylene glycol amine activator, an acid activator in an amount so as to essentially neutralize said amine, said acid activator selected from the group consisting of citric, tartaric, glycolic, glutaric, malonic, acetic, sulfonic, hydrochloric, sulfuric and a solvent mixture.

6. The flux recited in claim 1, wherein the amine activator is an aminopolyalkaline glycol present in an amount of from 5 to 45 weight percent, the acid is present in an amount of from 2 to 35 weight precent and the solvent mixture is present in an amount of from 30 to 70 weight percent of the flux composition.

7. The flux recited in claim 6 including from 0–25 weight percent of a vehicle and from 0 to 8 weight percent of an amine hydrohalide activator and wherein the pH is from about 6–7.

8. The flux recited in claim 7, wherein said vehicle is polypropylene glycol.

9. The flux recited in claim 1, wherein the solvent mixture constitutes a relatively high boiling point solvent and a lower boiling point solvent.

10. The flux recited in claim 9, wherein the solvents comprise diethylene glycol monomethylether and 2-methoxy ethanol.

11. The flux recited in claim 5, wherein the amine activator is an aminopolyalkaline glycol present in an amount of from 5 to 45 weight percent, the acid is present in an amount of from 2 to 35 weight percent and the solvent mixture is present in an amount of from 30 to 70 weight percent of the flux composition.

12. The flux recited in claim 11 including from 0–25 weight percent of a vehicle and from 0 to 8 weight percent of an amine hydrohalide activator and wherein the pH is from about 6–7.

13. The flux recited in claim 12, wherein said vehicle is polypropylene glycol.

14. The flux recited in claim 5, wherein the solvent mixture constitutes a relatively high boiling point solvent and a lower boiling point solvent.

15. The flux recited in claim 14, wherein the solvents comprise diethylene glycol monomethylether and 2-methoxy ethanol.

16. A rosin free water soluble flux comprising 5 to 45 weight percent aminopolypropylene glycol, 0–25 weight percent polypropylene glycol, 2–35 weight percent of an acid selected from the group consisting of citric, tartaric, glycolic, glutaric, malonic, acetic, sulfonic, hydrochloric, sulfuric and mixtures thereof, 0 to 8 weight percent diethylaminehydrochloride and 30–70 weight percent solvent and having a pH of from about 6 to 7 measured in an aqueous 5% flux solution.

17. The flux recited in claim 16, wherein the aminopolypropylene glycol is N,N,N,N-tetraisopropylethylene diamine and wherein the solvent comprises a mixture of diethylene glycol monomethylether and 2-methoxy ethanol.

18. The flux recited in claim 1 prepared by slowly adding the acid to a heated mixture of the amine activator in a high boiling point solvent, cooling and then adding a low boiling point solvent.

19. A method of soldering a metal comprising applying to a surface a soldering flux as recited in claim 1, heating the metal to the desired soldering temperature and applying solder to the surface.

20. A method of soldering a metal comprising applying to a surface a soldering flux as recited in claim 5, heating the metal to the desired soldering temperature and applying solder to the surface.

21. A method of soldering a metal comprising applying to a surface a soldering flux as recited in claim 16, heating the metal to the desired soldering temperature and applying solder to the surface.

* * * * *